(12) United States Patent
Daly

(10) Patent No.: US 7,440,633 B2
(45) Date of Patent: Oct. 21, 2008

(54) ENHANCING THE QUALITY OF DECODED QUANTIZED IMAGES

(75) Inventor: Scott J. Daly, Kalama, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 870 days.

(21) Appl. No.: 10/741,913

(22) Filed: Dec. 19, 2003

(65) Prior Publication Data

US 2005/0135694 A1 Jun. 23, 2005

(51) Int. Cl.
*G06K 9/36* (2006.01)
(52) U.S. Cl. ...................... 382/254; 382/100
(58) Field of Classification Search ................. 382/254, 382/100
See application file for complete search history.

(56) References Cited

U.S. PATENT DOCUMENTS

| | | | |
|---|---|---|---|
| 4,020,462 A | 4/1977 | Morrin et al. | |
| 4,097,845 A * | 6/1978 | Bacus | 382/134 |
| 4,196,452 A | 4/1980 | Warren et al. | |
| 4,223,340 A | 9/1980 | Bingham et al. | |
| 4,268,864 A | 5/1981 | Green | |
| 4,399,461 A | 8/1983 | Powell | |
| 4,402,006 A | 8/1983 | Karlock | |
| 4,523,230 A | 6/1985 | Carlson et al. | |
| 4,536,796 A | 8/1985 | Harlan | |
| 4,549,212 A | 10/1985 | Bayer | |
| 4,553,165 A | 11/1985 | Bayer | |
| 4,613,986 A * | 9/1986 | Ataman et al. | 382/260 |
| 4,962,426 A | 10/1990 | Naoi et al. | |
| 4,977,605 A | 12/1990 | Fardeau et al. | |
| 5,025,312 A | 6/1991 | Faroudja | |
| 5,218,649 A | 6/1993 | Kundu et al. | |
| 5,227,869 A | 7/1993 | Degawa | |
| 5,260,791 A | 11/1993 | Lubin | |
| 5,389,978 A | 2/1995 | Jeong-Hun | |
| 5,420,431 A * | 5/1995 | Nishiki | 250/370.09 |
| 5,438,633 A * | 8/1995 | Ghaderi | 382/270 |
| 5,515,180 A * | 5/1996 | Maeda et al. | 358/3.15 |
| 5,526,446 A | 6/1996 | Adelson et al. | |
| 5,539,866 A * | 7/1996 | Banton et al. | 358/1.18 |
| 5,585,818 A * | 12/1996 | Shibamiya | 345/581 |
| 5,587,711 A * | 12/1996 | Williams et al. | 341/144 |
| 5,651,078 A * | 7/1997 | Chan | 382/261 |
| 5,696,852 A | 12/1997 | Minoura et al. | |
| 5,844,611 A * | 12/1998 | Hamano et al. | 375/240.2 |
| 5,912,992 A | 6/1999 | Sawada et al. | |

(Continued)

FOREIGN PATENT DOCUMENTS

JP    03102579    4/1991

(Continued)

OTHER PUBLICATIONS

Tilne Jarske, Petri Haavisto and Irek Defee, "Post-Filtering Methods for Reducing Blocking Effects From coded Images," IEEE, Jun. 27, 1994.

*Primary Examiner*—Samir A Ahmed
*Assistant Examiner*—Michael Vanchy, Jr.
(74) *Attorney, Agent, or Firm*—Chernoff, Vilhauer, McClung & Stenzel

(57) ABSTRACT

A system for image enhancement and, more particularly, a system for enhancing the quality of a quantized image.

25 Claims, 5 Drawing Sheets

U.S. PATENT DOCUMENTS

| | | |
|---|---|---|
| 5,920,653 A | 7/1999 | Silverstein |
| 5,956,470 A * | 9/1999 | Eschbach .................... 358/1.9 |
| 6,038,576 A * | 3/2000 | Ulichney et al. ............ 708/208 |
| 6,055,340 A | 4/2000 | Nagao et al. |
| 6,381,373 B1 * | 4/2002 | Suzuki et al. ............... 382/263 |
| 6,441,867 B1 * | 8/2002 | Daly .......................... 348/607 |
| 6,504,953 B1 | 1/2003 | Behrends |
| 6,522,784 B1 * | 2/2003 | Zlotnick ..................... 382/245 |
| 6,546,143 B1 * | 4/2003 | Taubman et al. ............ 382/240 |
| 6,642,962 B1 * | 11/2003 | Lin et al. .................... 348/252 |
| 6,661,421 B1 * | 12/2003 | Schlapp ...................... 345/530 |
| 2001/0031083 A1 * | 10/2001 | Weldy ........................ 382/167 |
| 2004/0252201 A1 * | 12/2004 | Meitav et al. ............. 348/211.3 |

FOREIGN PATENT DOCUMENTS

| | | |
|---|---|---|
| JP | 08009154 | 1/1996 |
| JP | 09261464 | 10/1997 |

\* cited by examiner

ENHANCING THE QUALITY OF DECODED QUANTIZED IMAGES

BACKGROUND OF THE INVENTION

This invention relates to a system for image enhancement and, more particularly, to a system for enhancing the quality of a quantized image.

As the state of the art of digital signal technology advances, related technologies such as digital image processing has experienced a corresponding growth and benefit. For example, the development and proliferation of facsimile communications allows images to be encoded into digital signals, transmitted over conventional telephone line, and decoded into a close representation of the original images. Image data are also digitally encoded for ease of storage, modification, copying, etc. As is common experience with growing technologies, the field of digital image processing is also experiencing problems with applications in new areas.

Problems in the area of digital image processing relate generally to achieving a balance between acceptable image distortion and bit-depth representations. In order to increase the efficiency and therefore the usefulness of digital image decoding schemes, the coding system must provide a coded set of image data that is more efficient to store, transmit, etc., than the original image data and must reproduce a decoded image with some minimum level of quality. However, the conversion of relatively high bit rate image data to lower bit rate data virtually always entails a loss of image quality.

One straightforward method for digitizing an image is to create an artificial grid over the image and to assign a value to each grid space representing the color of the original image at that grid space. If the grids are made small enough and the values represent a large enough range of color, then the image may be encoded and decoded with small image quality degradation. For example, display screen images are made up of an array of pixels, i.e., picture elements. On a black and white screen, each pixel has a value of one or zero representing the on/off state of the pixel. In a one-to-one bit-to-pixel coding scheme, each pixel value is represented as a 1 or as a 0 and the entire screen image is encoded. The result of the encoding is an array of binary values. To decode the image, the array values are translated into a screen image having pixels on or off in the same order in which they were originally encoded.

If the image is comprised of more than two distinct colors, then more than a 1-bit code must be used to represent the pixel values. For example, if four distinct colors are present in the image, a 2-bit binary code can represent all of the values. If the image includes 256 distinct colors, an 8-bit binary code is required to uniquely represent each of the color values. The memory requirements for such coding schemes increase as the number of distinct colors in the image increases. However, with high bit-depth representation schemes, the quality of the image that results will be good as long as the digital image transmission or recovery from storage is successful.

To reduce the size of the encoded digital image, the bit-depth representation of the image may be reduced in some manner. For example, an image with a bit-depth of 6 bits per pixel requires significantly less storage capacity and bandwidth for transmission than the same sized image with 16 bits per pixel.

Decoded images, constructed by a low bit-depth representation, generally suffer from the following types of degradations: (a) quasi-constant or slowly varying regions suffer from contouring effects and amplified granular noise, and (b) textured regions lose detail.

Contouring effects, which are the result of spatial variations, in a decoded image are generally fairly obvious to the naked eye. The contouring effects that appear in the slowly varying regions are also caused by the fact that not all of the variations in the intensity of the original image are available for the decoded image. For example, if a region of the original image included an area having 4 intensity changes therein, the decoded image might represent the area with only 2 intensities. In contrast to the contouring effects, the effect of the granular noise on the viewed image is often mitigated by the very nature of the textured regions. But it can be both, amplified or suppressed due to quantization, as well as altered in spectral appearance.

Kundu et al., U.S. Pat. No. 5,218,649, disclose an image processing technique that enhances images by reducing contouring effects. The enhancement system identifies the edge and non-edge regions in the decoded image. Different filters are applied to each of these regions and then they are combined together. A low pass filter (LPF) is used on the non-edge regions, and a high-pass enhancer is used on the edge regions. Kundu et al. teaches that the contour artifacts are most visible in the non-edge areas, and the LPF will remove these edges. Unfortunately, problems arise in properly identifying the edge regions (is a steep slope an edge or a non-edge?). In addition, problems arise in setting thresholds in the segmentation process because if the contours have a high enough amplitude, then they will be classified as edges in the segmentation, and thus not filtered out. Moreover, the image segmentation requires a switch, or if statement, and two full-size image buffers to store the edge map and smooth map, because the size of these regions varies from image to image, all of which is expensive and computationally intensive.

Chan, U.S. Pat. No. 5,651,078, discloses a system that reduces the contouring in images reproduced from compressed video signals. Chan teaches that some contours result from discrete cosine transformation (DCT) compression, which are more commonly called blocking artifacts. Chan observes that this problem is most noticeable in the dark regions of image and as a result adds noise to certain DCT coefficients when the block's DC term is low (corresponding to a dark area). The resulting noise masks the contour artifacts, however, the dark areas become noisier as a result. The dark areas thus have a noise similar to film-grain-like noise which may be preferable to the blocking artifacts.

What is desirable is a system for reducing contouring effects of an image. Because the system does not necessarily affect the encoding or transmission processes, it can be readily integrated into established systems.

DETAILED DESCRIPTION OF THE PREFERRED EMBODIMET

Figure 1:
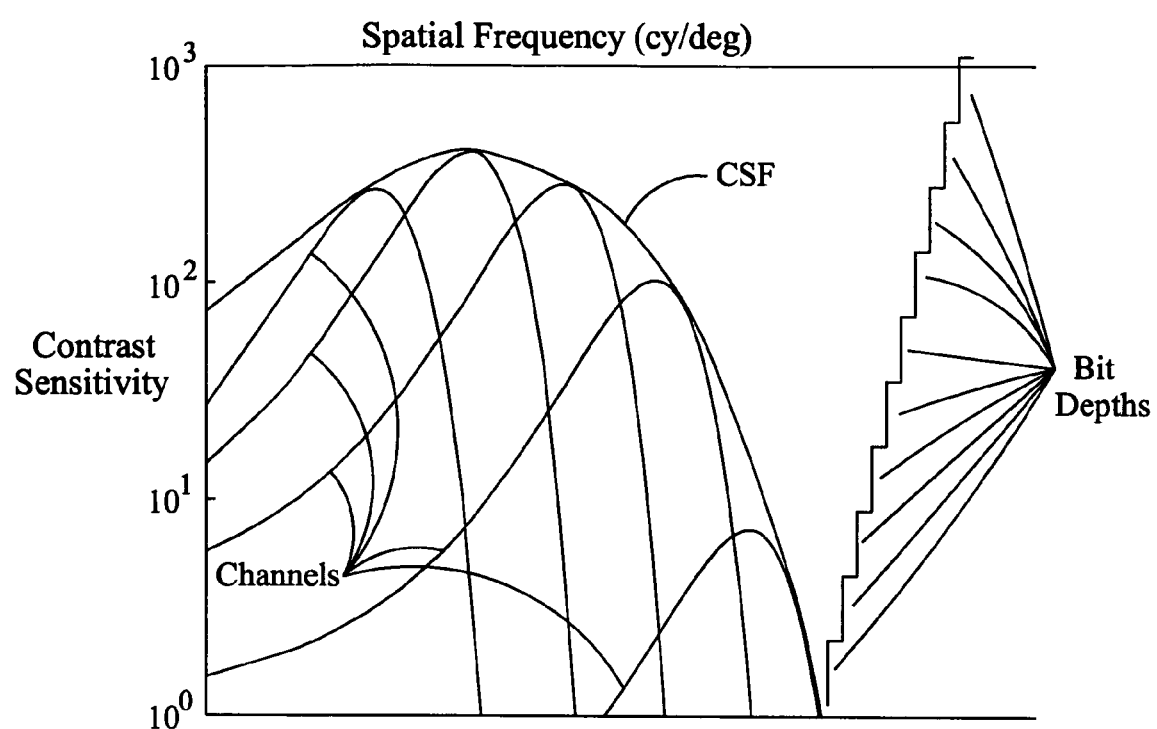
FIG. 1 illustrates a contrast sensitivity function.

The present inventor observed that the many of the objectionable contouring effects in images appear in regions of the image that are generally free from a significant number of edges or otherwise high texture. The present inventor similarly observed fewer objectionable contouring effects in regions of the image that have a significant number of edges or otherwise high texture. After consideration of this difference in observing objectionable contouring effects, the present inventor considered that the human visual system has lower sensitivity to these contour effects in the high frequency regions of the image and the human visual system has higher sensitivity to these contour effects in the low frequency regions of the image. FIG. 1 depicts the overall spatial response of the human visual system with its underlying visual channels with the coarse quantization below the threshold. Further, the masking effects by the higher frequency content of the image, which is limited to the channels as shown in FIG. 1, further inhibits the visibility of the steps in the waveforms in the high frequency regions of the image.

In order to preserve the quality of the image, the system preferably (albeit not necessary) reduces the effects of the objectionable contours without having to add noise to the image in order to hide them. Thus the system is suitable for use with images that are otherwise free of image capture noise, such as computer graphics and line art with gradients. Moreover, it would be preferable (albeit not necessary) that the technique is implemented without decision steps or if statements to achieve computational efficiency. Also, the technique should require not more than a single buffer of a size less than or equal to the image, and more preferable a buffer less than 30, 20, or 10 percent of the size of the image.

Figure 2:
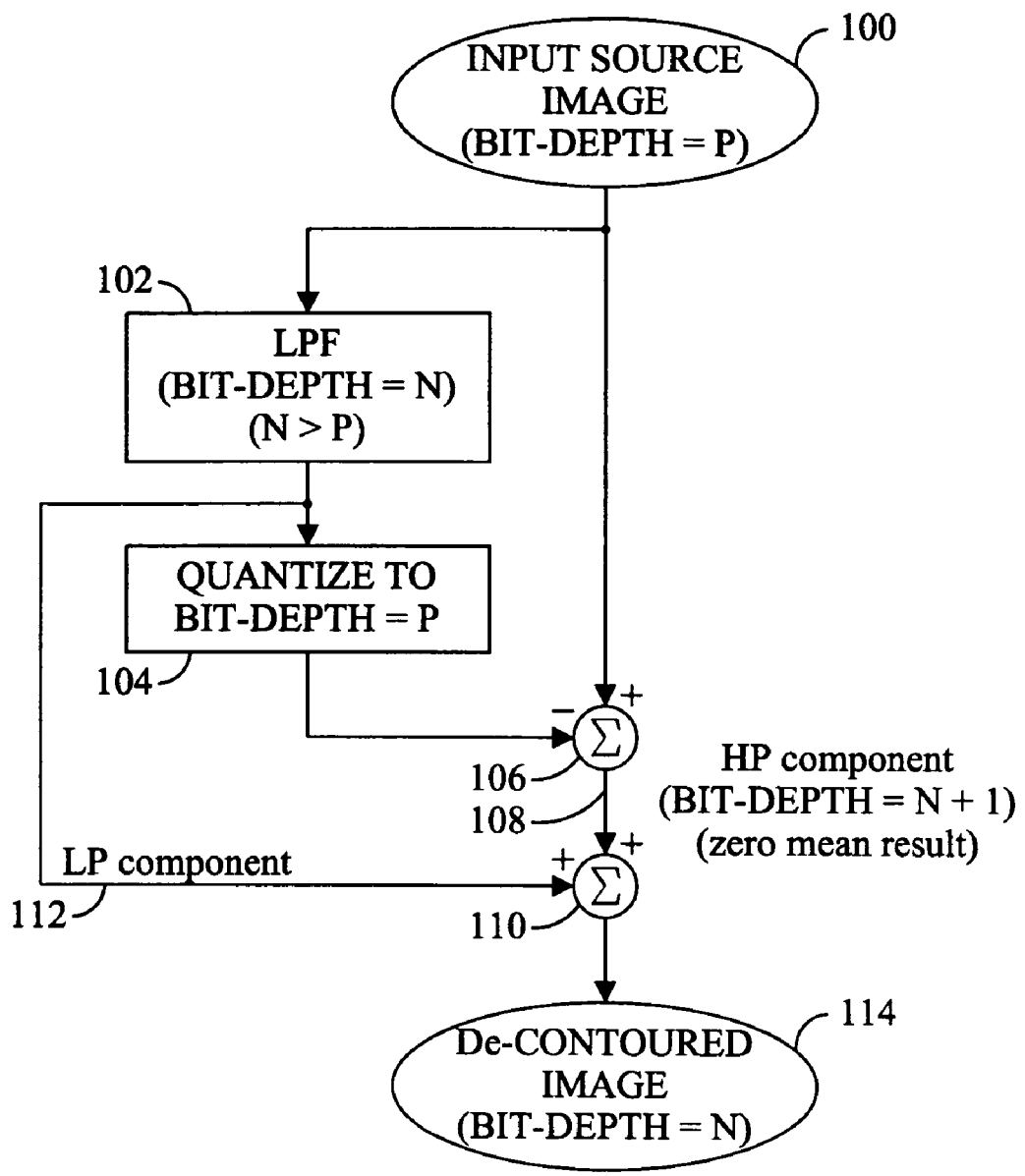
FIG. 2 illustrates an image processing technique.

Referring to FIG. 2, an input image 100 is provided with bit-depth P. The bit-depth P is frequently 8-bits for many images. As previously described, the image with a bit depth of P is normally quantized into $2^P$ different values but may exhibit contouring effects when displayed on a display with a different bit depth, such as a 10 bit display. In order to reduce those aspects of the image that are likely to exhibit contouring effects the present inventor came to the realization that the aspects of the image that will create contouring effects should be identified in a suitable manner. In another case, the image may be represented as P bits, but actually have quantization artifacts due to less than P bits. An example is a DVD image which is represented at 8 bits/color but only has 6 bits/color of real information because of the quantization of P or B-frames, or in the YCbCr to RGB conversion. In many cases, such as DVD applications, the bit-depth limitation comes from the inaccurate color matrix calculation (e.g., insufficient bit-depth in the registers).

To reduce the false step edges of contouring the image is preferably low-pass filtered 102. The low-pass filter applied to the image also acts to increase the bit depth, since the low pass filter is primarily an averaging operation (averaging across a neighborhood of pixels), and the averaging results in a higher precision. Other techniques may likewise be applied to effectively modify the bit depth of the image. In some cases, the system may also modify the bit depth by switching the number of bits used for processing the image, such as 8 bits to 16 bits. One way of characterizing an increase in the bit depth of an image is to modify in any manner an image to $2^N$ different levels, where N≠P. Alternatively, the image may already have a bit-depth needed/desired for the output (P=N), but the image itself may have a limited bit depth of P (P<N) from a previous operation. In this case, the value of P should be known or otherwise determined. Alternatively, the image may have a bit-depth of N, but the image itself may have a limited bit-depth of P (P<N).

The result of the low pass filtering of the image is to modify the image to achieve a bit depth of N. In most cases the bit depth N is the desired bit depth in the final image, such as an image having bit depth N to be displayed on a N bit display. The low pass filter should be sufficiently wide (in the spatial domain) to reduce most false steps (contouring) due to the bit-depth limit P. It is noted that the low pass filter likewise reduces other desirable image information within the image, so merely low-pass filtering the image is insufficient. Note that the low pass filter also reduces much useful image information, such as by severely blurring the image, so this step is insufficient to properly rectify the undesirable contouring.

The resulting image from the low pass filter is primarily the low frequency components of the image. It is likewise to be understood that any suitable filter may be used, such as one that generally attenuates the high frequency components with respect to the low frequency components of the image.

The resulting image from the low pass filter is then used to predict or otherwise simulate the contouring that would have occurred in the low-frequency aspects of the image. The resulting image from the low pass filter is then quantized to the bit-depth P (e.g., the original image bit-depth) or other bit depth at block 104. Since the image prior to being quantized has reduced edge sharpness and reduced high frequency content, the edges that occur as a result of quantizing the image are representative of false contouring in the original image. Accordingly, the result is an estimation of the false contours of the image caused by the quantization process of bit-depth P, especially those false contours in the low frequency regions of the image which are objectionable to the viewer.

After estimating the false contouring of the image, the system may subtract the image containing estimates of the false contours from the original bit-depth limited image 106. This in essence reduces the low-frequency content of the input image, while primarily leaving the high frequency content. However, the subtraction also results in another important attribute, namely, it also removes the high frequencies that are a result of the quantization appearing in the low frequency regions of the image. That is, the high frequency and low frequency components of the contour artifacts are reduced to the extent that the estimated contour artifacts are correct.

It would be noted that the system does not significantly remove the quantization artifacts in the higher frequency aspects of the image. This is because, while the contours estimated by the quantization are fairly accurate in low frequency components, that are not correct in high frequency components because it starts with a merely low pass filtered image issued at step 104. As previously noted, there is limited need to remove the quantization artifacts in the higher frequency aspects of the image because they are masked by the actual high frequency image content. For purposes of identification, this resulting image may be referred to as the high pass image 108. The subtraction process leads to a bit-depth increase of 1 due to the sign. For example a subtraction of two images with 0 to +255 results in an image with a range from −255 to +255. Hence the high pass image 108 has N+1 bit depth (this is based upon a source image being padded to N bits before the subtraction operation). Padding may include inserting 0's and/or 1's to the least significant bits that are missing from the lower bit depth representations relative to the higher.

It is noted that the output of the filter may not need N+1 bits, but it should be able to carry a sign, and thus have a zero mean level. If only N bits are used and one bit is dedicated to the sign, then only N−1 bits are available for addition to the low pass filter image (in the last addition step) at 100. In that case some edge sharpness and detail may be lost.

The next step is to add the high pass image 108 and the filtered low pass components 112 together at 110. It is preferable to use the low pass filtered version of the source image for the low pass portion 110, as opposed to the quantized version of the low pass filtered image because the low pass filtering acts to create a ramp across the steps of the false contours. The result of this addition operation is N+1 bits. It is N+1 since the range may be larger than the input image (for example if the low pass component for N bits may be 0 to +255, the high pass component may have a range of N+1 (−255 to +255) and the result is −255 to +512). Anything out of the range of N bits is clipped (e.g., out of range 0 to +255 for N=8). It turns out that there are a limited number of pixels that fall out of that range, and when they do, they are usually isolated edge pixels. The clipping that occurs as a result is not readily visible in the final image 114.

Figure 3:
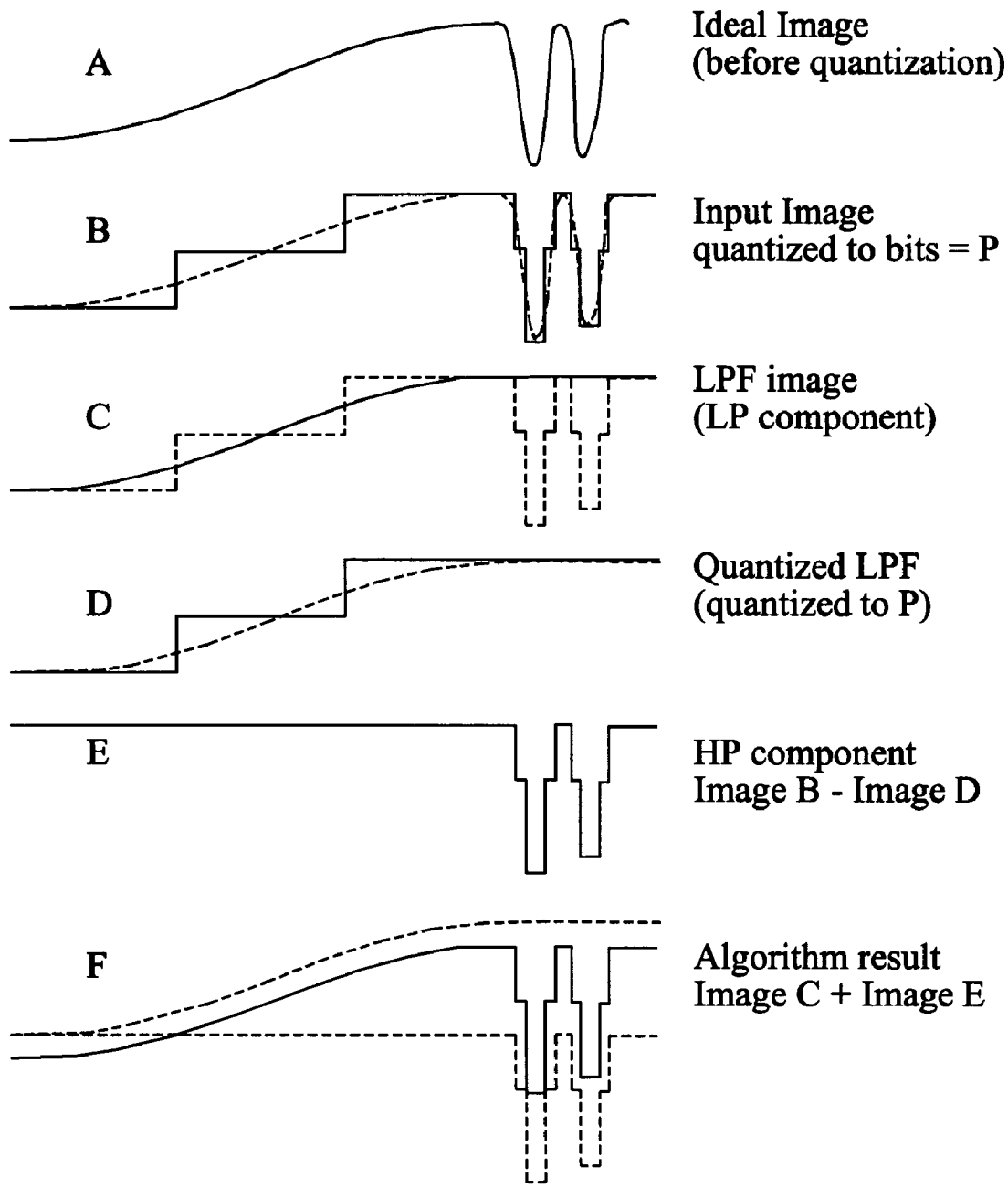
FIG. 3 illustrates waveform for the image processing technique of FIG. 2.

For purposes of illustration, example waveforms associated with these primarily image modifications are shown in FIG. 3. Waveform A is what the image may look like in cross-section, but waveform B is what is available due to some bit-depth limitation in the preceding image pipeline or the bit-depth that the image was obtained, shown in solid, with the ideal waveform A shown dotted for reference. The output of the low pass filter step on the input is shown in waveform C as solid, with the quantized waveform B shown as dotted. The quantized version of the low pass filtered image is shown in waveform D as solid, with its LPF input shown as dotted. The high pass component generated from subtracting the quantized low pass filtered waveform D from the input waveform B is shown as solid as waveform E. Finally, the last step adds waveform C and waveform E (both shown dotted) to get the resulting waveform F (shown as solid, with a slight vertical offset to allow visibility of the input dotted components of this step). In the smooth region, the contours due to the coarse quantization of P is reduced, while in the high frequency regions, the coarse quantization is allowed to remain where it is difficult to see because of masking.

Figure 4:
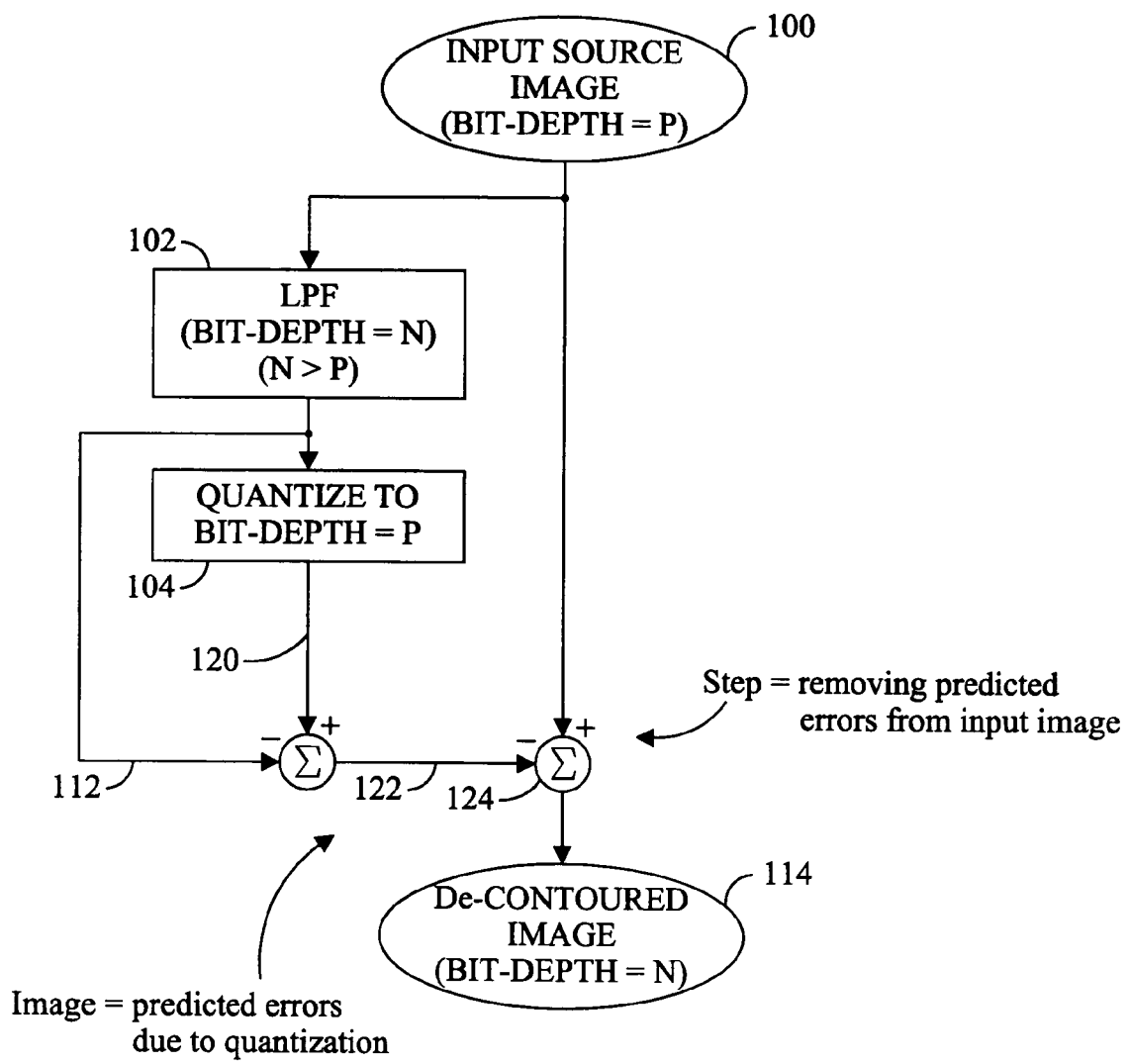
FIG. 4 illustrates another image processing technique.

Referring to FIG. 4 an alternative arrangement is illustrated. FIG. 4 illustrates using the associative property of math to re-arrange the operations shown in FIG. 3 to achieve the same (or similar) result.

As shown in FIG. 4, the low pass filtered image with high bit-depth 112 and the quantized low pass filtered image 120 are first combined to create a predicted error image 122. The predicted error image 122 should have a zero mean and be subtracted from the source image at 124 to essentially remove the error signal from the source to get the desired image. As in FIG. 2, the system predicts and reduces the contouring error in the low frequencies.

Figure 5:
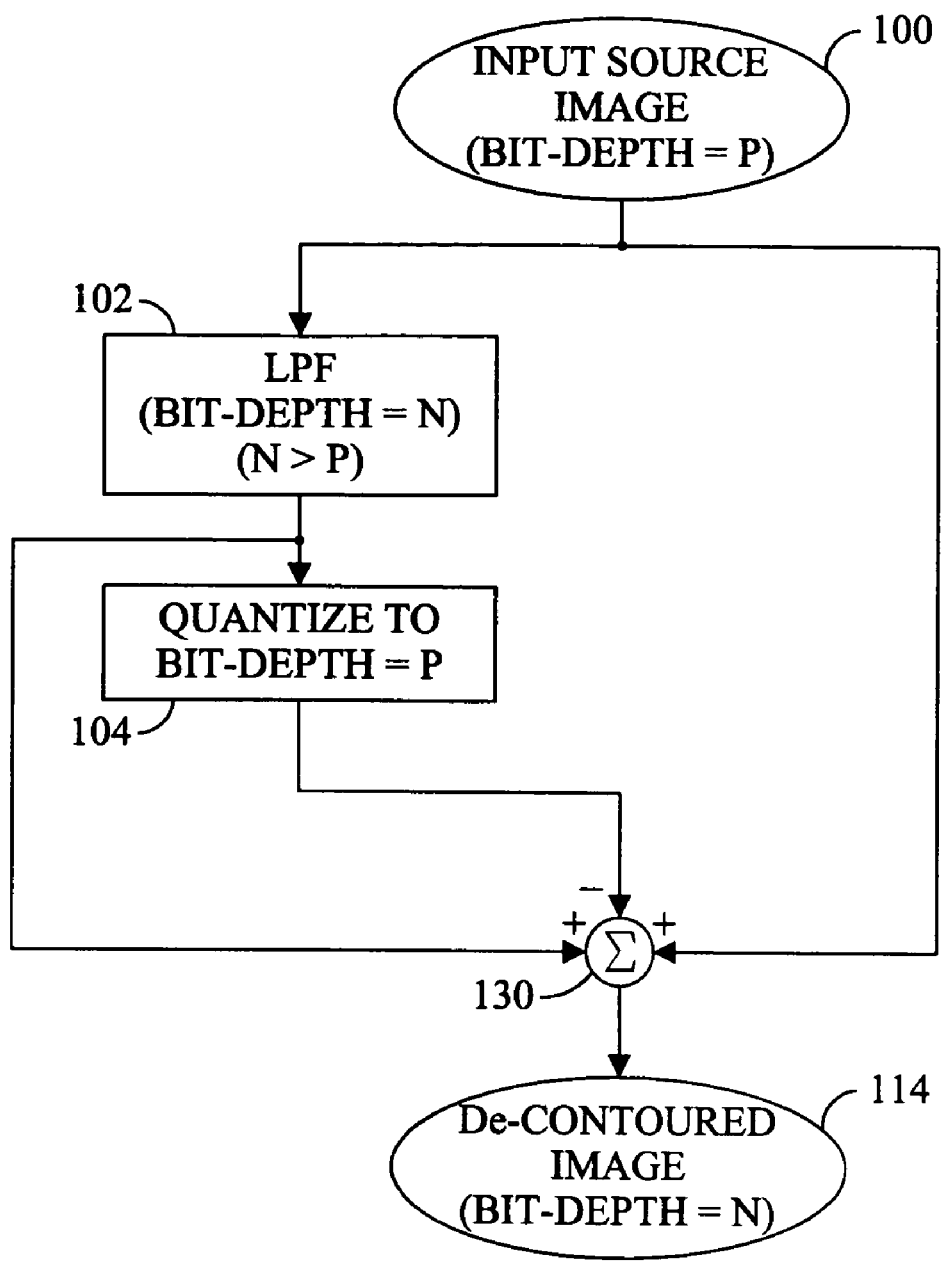
FIG. 5 illustrates yet another image processing technique.

The two variations illustrated in FIG. 2 and FIG. 4 offer explanative block diagrams, but the preferred embodiment for computational efficiency is shown in FIG. 5. As illustrated in FIG. 5, the add operations may be combined in a single step 130, thus removing the need for intermediate stored images. FIG. 5 is also mathematically equivalent to the versions shown in FIG. 2 and FIG. 4.

The number of gray levels is given by N or P, which are bit-depths, so the numbers of levels is $2^N$ or $2^P$. However, another embodiment is to not use bit-depth to determine the number of gray levels, but the numbers of gray levels directly.

In a particular implementation, each of the steps shown in FIGS. 2, 4, and 5 may be applied to the entire image in a sequential manner, which may result in the need for large buffers. However, a more memory efficient technique involves using as a sliding window, where the computations within the window are used to compute the pixel at the center of the window (or in some other position in the window). This reduces the memory requirements.

The preferred embodiment uses a version where the low pass filter is implemented in two Cartesian separable steps (i.e., a cascade of horizontal and vertical steps), and the filter width spatially is 10 pixels, with a uniform impulse response. A two-dimensional filter may likewise be used, such as a two-dimensional Gaussian filter.

In a typical implementation the bit-depth of the input and output images are known in advance. This is typically the case in many applications, such as display an eight bit image on a 10-bit display.

The invention claimed is:

1. A method for modifying an image comprising:
   (a) receiving a first image having a first bit depth;
   (b) modifying said first image, resulting in a second image having a second bit depth different than said first bit depth, in such a manner that the higher frequency content with respect to the lower frequency content of said second image is attenuated;
   (c) quantizing said second image;
   (d) padding said first image having said first bit depth, resulting in a third image, and adjusting said third image using the quantized said second image; and
   (e) adding said second image to the adjusted said third image.

2. The method of claim 1 wherein said received image of step (a) is represented by X bit depth.

3. The method of claim 2 wherein said second image is represented by Y bit depth.

4. The method of claim 3 wherein X >Y.

5. The method of claim 1 wherein said modifying of step (b) is a low pass filter.

6. The method of claim 1 wherein said modifying of step (b) amplifies said lower frequency content.

7. The method of claim 1 being performed in a manner using a buffer smaller than 100 percent of said received image.

8. The method of claim 1 being performed in a manner using a buffer smaller than 30 percent of said received image.

9. The method of claim 1 being performed in a manner that is free from adding additional noise to said image.

10. The method of claim 1 being performed in a manner based upon the human visual system.

11. A method for modifying an image having a first bit depth to an image having a second bit depth, wherein said second bit depth is greater than said first bit depth comprising:
    (a) receiving an image having said first bit depth;
    (b) processing said image resulting in said second bit depth greater than said first bit depth in such a manner that the higher frequency content with respect to the lower frequency content of said modified image is attenuated, wherein said processing said image does not pad said image;
    (c) quantizing said processed image;
    (d) padding said image having said first bit depth and adjusting the padded said image using said quantized process image; and
    (e) adding the quantized modified said image to the adjusted padded said image.

12. The method of claim 11 wherein said processing includes modifying said image resulting in a second bit depth different than a first bit depth of said received image in such a manner that the higher frequency content with respect to the lower frequency content of said modified image is attenuated.

13. The method of claim 11 wherein said processing of step (b) is a low pass filter.

14. The method of claim 11 being performed in a manner using a buffer smaller than 100 percent of said received image.

15. The method of claim 11 being performed in a manner using a buffer smaller than 30 percent of said received image.

16. The method of claim 11 being performed in a manner that is free from adding additional noise to said image.

17. The method of claim 11 being performed in a manner based upon the human visual system.

18. The method of claim 11 wherein said image having said first bit depth has been previously quantized to a lesser bit depth.

19. The method of claim 18 wherein said second bit depth is quantized to said bit depth.

20. A method for modifying an image having a first bit depth to an image having a second bit depth, wherein said second bit depth is greater than said first bit depth comprising:
 (a) receiving an image having said first bit depth;
 (b) processing said image using a low pass filter to result in a processed image having at least a bit depth as large as said second bit depth;
 (c) quantizing said processed image to a bit depth at least as small as said first bit depth; and
 (d) padding the received said image, unprocessed by said low pass filter, and modifying the padded said image unprocessed by said low pass filter using the processed, quantized said image; and
 (e) adding at least one of the modified, padded said image and the processed, quantized said image to the padded said image.

21. A method for modifying an image having a first bit depth to an image having a second bit depth, wherein said second bit depth is greater than said first bit depth, said method comprising:
 (a) receiving an image with said first bit depth having the characteristic that contouring results when said image is presented with said second bit depth;
 (b) processing said image using a low pass filter to result in a processed image having at bit depth at least as great as said second bit depth;
 (c) quantizing said processed image to a bit depth at least as small as said first bit depth to identify regions of said image that would contain said contouring when said image is presented with said second bit depth; and
 (d) modifying said quantized image with a padded said processed image and said received image unprocessed by said low pass filter.

22. The method of claim 21 wherein said processed image has said second bit depth.

23. The method of claim 21 wherein said quantized image has said first bit depth.

24. The method of claim 21 wherein said quantized image has a bit depth less than said first bit depth.

25. The method of claim 21 wherein said processed image has a bit depth greater than said second bit depth.

* * * * *